United States Patent
Seurat Guiochet et al.

(10) Patent No.: US 7,322,280 B2
(45) Date of Patent: Jan. 29, 2008

(54) APPLIANCE FOR COOKING FOOD UNDER PRESSURE

(75) Inventors: Claire Marie-Aurore Seurat Guiochet, Dijon (FR); Daniel Jean-Marie Anota, Dijon (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 10/998,323

(22) Filed: Nov. 26, 2004

(65) Prior Publication Data
US 2005/0139089 A1     Jun. 30, 2005

(30) Foreign Application Priority Data
Nov. 27, 2003   (FR)  .................................. 03 13938

(51) Int. Cl.
*A47J 37/00*     (2006.01)
(52) U.S. Cl. ........................... 99/337; 99/403; 220/316
(58) Field of Classification Search .................. 99/330, 99/337, 338, 403–407, 339, 340, 341, 342; 126/369, 373.1, 384.1, 389.1; 219/440, 401; 220/314–316, 573.1, 291, 293, 324, 325, 220/203.19, 203.22, 323, 378; 292/DIG. 11, 292/57, 58, 63–66, 139, 140
See application file for complete search history.

(56) References Cited
U.S. PATENT DOCUMENTS

| | | | | |
|---|---|---|---|---|
| 5,293,813 A | * | 3/1994 | Schultz | ........................ 99/337 |
| 5,310,981 A | * | 5/1994 | Sarnoff et al. | .............. 219/731 |
| 5,317,959 A | * | 6/1994 | Beluzzi | ........................ 99/337 |
| 5,442,998 A | * | 8/1995 | Niese | ........................... 99/337 |
| 6,425,320 B1 | * | 7/2002 | Chameroy et al. | ............. 99/337 |
| 6,523,459 B1 | * | 2/2003 | Chameroy et al. | ............. 99/337 |

FOREIGN PATENT DOCUMENTS

| | | |
|---|---|---|
| DE | 34 36 884 A | 10/1984 |
| EP | 1 029 483 A1 | 2/1999 |
| FR | 2816491 | 11/2000 |
| FR | 2825256 | 5/2001 |
| WO | WO 03/064897 | 8/2003 |

* cited by examiner

*Primary Examiner*—Timothy F. Simone
(74) *Attorney, Agent, or Firm*—James W. Kayden; Thomas, Kayden, Horstemeyer & Risley, LLP

(57) ABSTRACT

A domestic appliance for cooking under pressure. The appliance includes a cooking bowl and a lid. The lid is configured to be fit and locked onto the bowl to form a substantially leaktight cooking enclosure. The appliance further includes: means for locking and unlocking the lid relative to the bowl; pressure regulator means arranged to maintain a relative pressure inside the enclosure at a substantially constant predetermined cooking pressure value; and activatable and deactivatable decompression means arranged, when activated, to allow the pressure that exists inside the enclosure to drop. The pressure regulator means may be configured to maintain the cooking pressure substantially in the range of 10 kPa to 30 kPa.

10 Claims, 2 Drawing Sheets

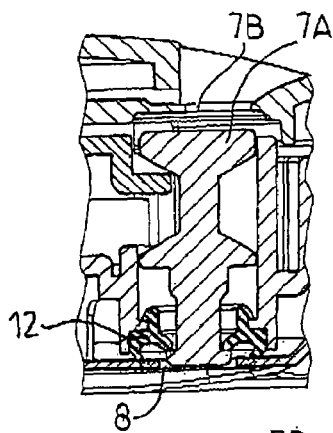
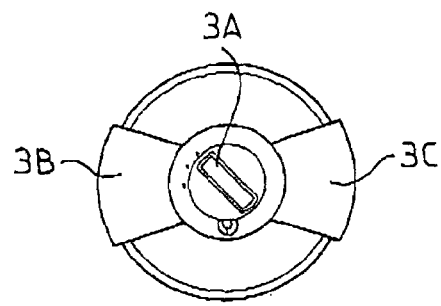
FIG.3   FIG.4
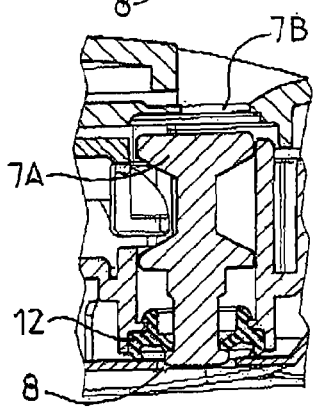
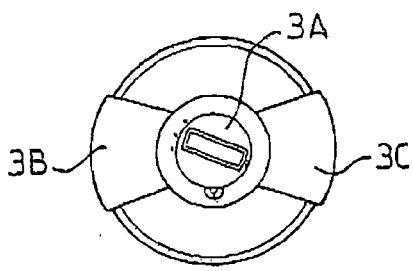
FIG.5   FIG.6
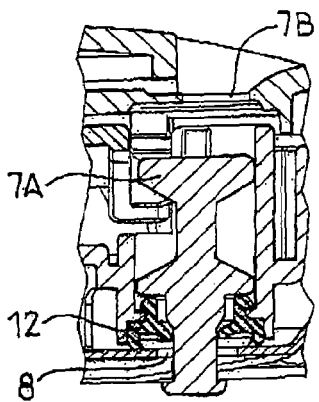
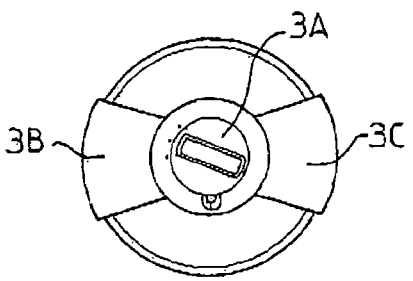
FIG.7   FIG.8
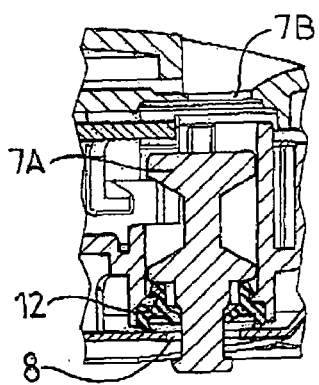
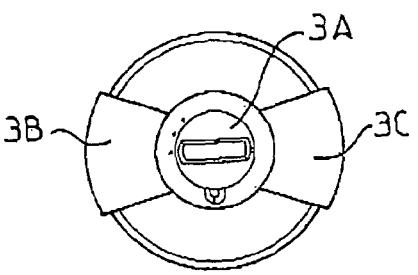
FIG.9   FIG.10

APPLIANCE FOR COOKING FOOD UNDER PRESSURE

CROSS-REFERENCE TO RELATED APPLICATION

This application claims priority to copending French Patent Application entitled, "An Appliance For Cooking Food Under Pressure," having Application No. FR-03 13938, filed on Nov. 27, 2003, which is entirely incorporated herein by reference.

The present invention relates to the general technical field of household appliances for cooking under pressure, such as pressure cookers, comprising a bowl and a lid for locking on the bowl to form a leaktight cooking enclosure, such appliances being designed to cook food contained in the bowl under steam pressure.

More particularly, the present invention relates to a household appliance for cooking under pressure and comprising:

a cooking bowl and a lid for fitting and locking on the bowl to form a substantially leaktight cooking enclosure;

means for locking and unlocking the lid relative to the bowl;

pressure regulator means arranged to maintain the relative pressure inside the enclosure at a predetermined value that is substantially constant and referred to as the cooking pressure, said regulator means being designed for the cooking pressure to lie substantially in the range 4.5 kilopascals (kPa) to 30 kPa;

activatable and deactivatable decompression means arranged, when activated, to allow the pressure that exists inside the enclosure to drop; and opening safety means responsive to the pressure that exists inside the enclosure and mounted to move between a low position in which it allows the lid to be locked and unlocked relative to the bowl, and a high position in which it co-operates with the locking and unlocking means to prevent the lid being unlocked relative to the bowl.

BACKGROUND OF THE INVENTION

Household appliances for cooking under pressure, of the pressure cooker kind, are well known.

They serve to provide a hermetically sealed enclosure within which food is placed, said enclosure being capable of reaching high pressures and temperatures when the appliance is subjected to the influence of a source of heat.

The combined effects of the high pressure and temperature levels reached in known pressure cookers enable food to be cooked extremely quickly, while nevertheless ensuring that the organoleptic and nutritional properties of the food are not harmed.

Although such known pressure cookers generally give full satisfaction, they nevertheless put constraints on the user concerning the way cooking is done.

The cooking of food using an appliance of the pressure cooker kind necessarily takes place continuously, i.e. the user cannot take any action directly on the food between the beginning and the end of the cooking process.

In other words, when cooking with a conventional pressure cooker, the user cannot open the lid temporarily while cooking is taking place, at least not in a manner that is simple and quick, for example in order to add ingredients, to taste the food, or more generally to monitor directly how cooking is progressing.

This impossibility for the user to open the lid of conventional pressure cookers while they are cooking, i.e. while the pressure cooker is still subjected to a source of heat, comes from the high level of pressure that exists inside the pressure cooker (relative pressure generally lying in the range 55 kPa to 90 kPa). Directly opening the lid while it is subjected to such pressure levels could lead to the lid being expelled suddenly, possibly together with scalding spray, thereby injuring the user more or less severely.

That is why, prior to any opening of the lid of a conventional pressure cooker, it is necessary to decompress the cooking enclosure, by ceasing to apply heat and by putting the inside of the enclosure into communication with the outside via valve systems provided for this purpose.

Because of the high level of pressure that exists inside the enclosure, the time taken for decompression is nevertheless generally quite long (even if the appliance is put under a stream of cold water), and as a result is incompatible with temporary opening of the lid while cooking is taking place. In addition, known cooking appliances are generally provided with safety systems governing opening that prevent the user from opening the lid of an appliance so long as the pressure inside the appliance is above atmospheric pressure. In order to open the lid, the user must therefore wait for the pressure within the enclosure to become substantially equal to atmospheric pressure; this waiting time is generally lengthy, and prevents known appliances for cooking under pressure being used as a stew pan, i.e. a utensil enabling the lid to be opened temporarily and quickly while cooking is taking place.

Cooking utensils are also known that comprise a bowl and a lid that enables food to be cooked substantially at atmospheric pressure, or at pressures that are slightly higher for certain utensils provided with a regulator valve and a system for locking the lid hermetically relative to the bowl.

Such low-pressure cooking utensils, unlike conventional pressure cookers, do indeed allow the lid to be opened directly and at will during a cooking cycle without it being necessary to begin by performing genuine prior decompression.

Although those utensils do indeed enable the user to open the lid substantially instantaneously while cooking is taking place, they do not provide the advantages associated with genuine pressure cooking, of the kind which takes place in conventional pressure cookers, particularly in terms of speed of cooking and preserving the properties of the food.

Those utensils behave more like somewhat-improved conventional stockpots.

OBJECTS AND SUMMARY OF THE INVENTION

Consequently, an object of the invention is to propose a novel household appliance for cooking under pressure that provides a remedy to the various drawbacks mentioned above and that enables cooking to be performed in a manner close to that which is obtained with conventional pressure cookers of the prior art, while still allowing the lid to be opened relatively easily and quickly at any time while cooking is taking place, without turning off the heat, and while still providing an excellent degree of safety.

Another object of the invention is to propose a novel household appliance for cooking under pressure that provides an excellent compromise in terms of speed of cooking and speed of decompression.

Another object of the invention is to provide a novel household appliance for cooking under pressure that presents an excellent compromise in terms of speed of cooking, flexibility of use, and safety.

Another object of the invention is to propose a novel household pressure cooker which is very easy to use.

The objects of the invention are achieved by means of a household appliance for cooking under pressure comprising:
- a cooking bowl and a lid for fitting and locking on the bowl to form a substantially leaktight cooking enclosure;
- means for locking and unlocking the lid relative to the bowl;
- pressure regulator means arranged to maintain the relative pressure inside the enclosure at a predetermined value that is substantially constant and referred to as the cooking pressure, said regulator means being designed for the cooking pressure to lie substantially in the range 4.5 kPa to 30 kPa;
- activatable and deactivatable decompression means arranged, when activated, to allow the pressure that exists inside the enclosure to drop; and
- opening safety means responsive to the pressure that exists inside the enclosure and mounted to move between a low position in which it allows the lid to be locked and unlocked relative to the bowl, and a high position in which it co-operates with the locking and unlocking means to prevent the lid being unlocked relative to the bowl.

According to the invention, the opening safety means is designed to move down towards its low position when the pressure inside the enclosure reaches a "descent" relative pressure that lies substantially in the range 1 kPa to 4 kPa.

BRIEF DESCRIPTION OF THE DRAWINGS

Other features and advantages of the invention appear and can be seen in greater detail on reading the following description made with reference to the accompanying drawings that are given purely by way of non-limiting illustration, and in which:

FIG. 3 is a fragmentary cross-section view showing an embodiment detail of the opening safety means for a cooking appliance in accordance with the invention, while the user is locking the lid relative to the bowl in leaktight manner;

FIG. 4 is a plan view of the cooking appliance of the invention corresponding to the details shown in FIG. 3;

FIG. 5 is a fragmentary cross-section view showing the embodiment detail shown in FIG. 3, but while the user is proceeding with decompression of the appliance;

FIG. 6 is a plan view showing the cooking appliance in accordance with the invention corresponding to the detail shown in FIG. 5;

FIG. 7 is a fragmentary cross-section view of the embodiment derail shown in FIG. 5, once decompression has been completed;

FIG. 8 is a plan view of the cooking appliance in accordance with the invention corresponding to the detail shown in FIG. 7;

FIG. 9 is a fragmentary cross-section view showing the same embodiment detail as shown in FIG. 7, but while the user is unlocking the lid; and FIG. 10 is a plan view of the cooking appliance of the invention corresponding to the detail shown in FIG. 9.

MORE DETAILED DESCRIPTION

The cooking appliance in accordance with the invention is for cooking various kinds of food under pressure in a household context. The cooking appliance to which the invention applies is thus intended for use in a family setting, and is therefore portable, unlike an industrial appliance.

In conventional manner, the cooking appliance in accordance with the invention comprises a bowl 1 forming a cooking receptacle that is preferably substantially circularly symmetrical about an axis X-X'. Below, the adjective "axial" is used to refer to the direction of said axis of symmetry X-X', which direction is close to vertical when the appliance is in normal operation.

In conventional manner, the bowl 1 is made from a metal such as stainless steel, and it is provided with a heat-conducting bottom 1A that is secured to the bowl 1, e.g. by hot stamping.

The bowl 1 may also have members for grasping, such as handles 1B and 1C, which are preferably two in number and are fastened to the bowl 1, e.g. in diametrically opposite positions.

The appliance also comprises a lid 2 designed to be fitted onto said bowl 1 so as to form a cooking enclosure that is substantially leaktight, i.e. that is sufficiently hermetically sealed to allow pressure to rise.

The lid 2 is advantageously generally disk-shaped, and its general diameter may be about 26 centimeters (cm), for example, which corresponds to the standard in force for stew pans.

The lid 2 may be locked (cf. FIGS. 4, 6, and 8) or unlocked (cf. FIG. 10) relative to the bowl 1 by a locking and unlocking means 3 for engaging the lid 2 relative to the bowl 1.

The locking and unlocking means 3 may be of any type known to the person skilled in the art, and in particular it may implement a manual control member 3A of the knob type, functionally connected to at least one member 3B, 3C for securing the lid 2 relative to the bowl 1.

Figure 1:
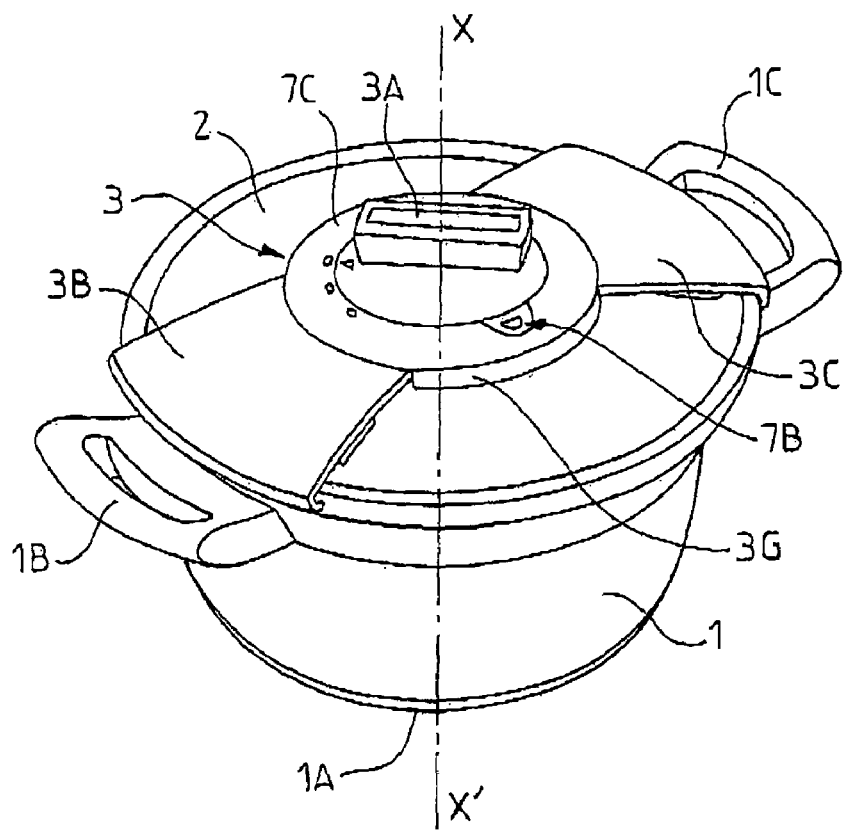
FIG. 1 is a general perspective view of a household appliance for cooking under pressure in accordance with the invention.

Below, reference is made more particularly to a locking and unlocking means having jaws 3B and 3C that are controlled by a rotary knob 3A, as shown in FIG. 1.

The jaws 3B, 3C may thus be in the form of metal plates having channel sections at their outer ends so as to be capable of clamping simultaneously over the peripheral rim of the bowl 1 and the peripheral rim of the lid 2.

As shown in the figures, there may advantageously be two jaws that are positioned diametrically opposite each other about the general axis of symmetry X-X' of the appliance.

Figure 2:
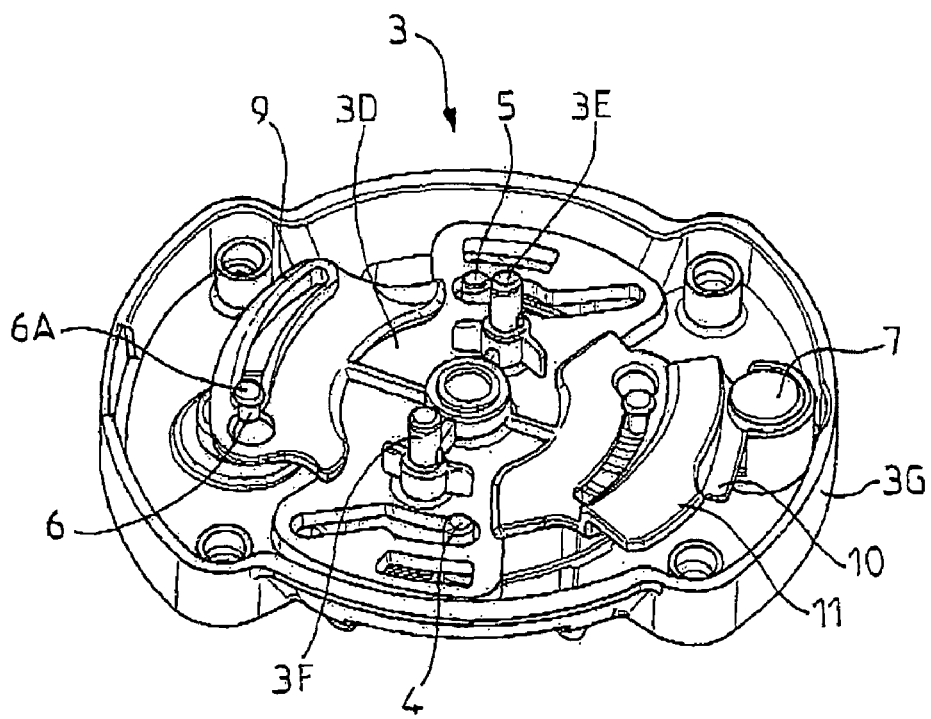
FIG. 2 is an exploded perspective view showing an embodiment detail of the lid of a cooking appliance in accordance with the invention.

The jaws are advantageously moved radially between their locking position and the unlocking position under the control of a rotary intermediate plate 3D which is turned directly under the control of the rotary knob 3A, said intermediate plate 3D acting on the jaws 3B and 3C, by moving in translation on guide studs 4 and 5 associated with the jaws 3B and 3C (cf. FIG. 2).

The knob 3A is secured to the intermediate plate 3D via fixing pins 3E and 3F. The assembly formed by the plate 3D and the knob 3A is mounted to turn relative to a seat 3G, which is itself fitted to the lid 2.

Nevertheless, the means 3 for locking and unlocking the lid 2 relative to the bowl 1 is not limited to a jaw system, and could, for example, be based on a bayonet-locking system, a segment-locking system, a locking-bar system, or on any other means well known to the person skilled in the art, without thereby going beyond the ambit of the invention.

The household cooking appliance in accordance with the invention also comprises pressure regulator means 6, arranged to maintain the relative pressure (i.e. pressure as measured above atmospheric pressure) that exists inside the enclosure at a substantially constant predetermined value referred to as the cooking pressure $P_c$.

The general principle of operation of such regulator means 6 is well known to the person skilled in the art.

Thus, in conventional manner, the pressure regulator means 6 is responsive to the pressure that, exists inside the cooking enclosure and can be mounted to move between a first position which is a stable position into which it is biased, in which it is in abutment, and in which it closes off communication between the enclosure and the outside of the appliance so long as the pressure inside the enclosure is substantially less than or equal to the predetermined cooking pressure $P_c$, and one (or more) leakage positions in which it puts the inside of the enclosure into communication with the outside of the appliance as soon as the pressure inside the enclosure exceeds the predetermined cooking pressure $P_c$.

Such pressure regulator means 6 thus serves to maintain pressure inside the enclosure around a predetermined nominal level $P_c$ once the appliance has completed its transient pressure rise and reached its steady operating state.

The pressure regulator means 6 could conventionally be constituted by a weighted valve or by a valve biased by a compression spring, and mounted to move in a well between a low, leaktight position and one or more high, leakage positions.

As is well known to the person skilled in the art, the pressure regulator means 6 may also be provided with a rating system enabling the user to select a predetermined value for the cooking pressure $P_c$ from a plurality of possible cooking pressure levels, by acting on a pressure selection member, e.g. as a function of the kind of food present in the cooking appliance.

In accordance with the invention, the cooking appliance also includes decompression means 6 suitable for being activated and deactivated, and arranged, when activated, to allow the pressure inside the enclosure to drop.

The functions of the activatable and deactivatable decompression means 6 of the cooking appliance in accordance with the invention are thus, in particular, the following:
  when the decompression means is deactivated, the decompression means allow substantially no steam to leak from the inside of the enclosure to the outside; and
  when the decompression means is activated, it puts the inside of the enclosure into communication with the outside so as to create a leak of steam, thereby causing the pressure inside the enclosure to decrease, said pressure varying from a first value corresponding to the cooking pressure $P_c$ to a second value that is lower, and compatible with the lid being unlocked under safety conditions that are acceptable for the user.

The decompression means 6 is preferably designed to be capable of being activated regardless of the level of the pressure that exists inside the enclosure, and in particular to be capable of being activated when the pressure inside the enclosure is substantially equal to the cooking pressure $P_c$.

The decompression means may be constituted by any conventional means known to the person skilled in the art.

In particular, the decompression means should be shaped and dimensioned in such a manner as to enable decompression to be achieved without any dangerous spraying of scalding cooking materials (food, cooking liquids), to the outside.

Advantageously, the functions of the decompression means are implemented by the pressure regulator means 6, which then performs two functions.

For this purpose, the regulator means 6 advantageously comprises an activatable engagement means 6A, e.g. in the form of an actuator head. This activatable engagement means 6, on being activated, serves to put the regulator means into the leakage position, so that said regulator means 6 also constitutes the activatable decompression means.

The decompression means, i.e. in this case the engagement means 6A (cf. FIG. 2), can be actuated directly by the user, e.g. manually, or indirectly, using a manual control member 3A causing a ramp 9 to be moved that is arranged to govern displacement of the engagement means 6A.

According to an important characteristic of the invention, the pressure regulator means 6 is designed and adapted to the cooking appliance so that the cooking pressure $P_c$ lies substantially in the range 4.5 kPa to 30 kPa, and more preferably in the range 10 kPa to 30 kPa.

In particular, the regulator means 6 is designed and dimensioned to regulate pressure lying in the range 4.5 kPa to 30 kPa, or 10 kPa to 30 kPa, regardless of the heating power to which the appliance is subjected.

The regulator means 6 is thus arranged to perform its function independently of the variability of heater sources present on the market.

The Applicant has found that selecting a cooking pressure $P_c$ to lie in the range 4.5 kPa to 30 kPa, or more preferably in the range 10 kPa to 30 kPa, provides an excellent compromise between firstly the time taken for cooking, and secondly the time taken for decompressing the appliance when it is desired to go from its cooking pressure $P_c$ to a lower pressure that is compatible with opening the lid under acceptable safety conditions for the user.

It turns out that a cooking pressure $P_c$ lying in the above-specified ranges permits a decompression time that is sufficiently short to be compatible with temporarily opening the lid during cooking, e.g. in order to add seasoning, or to taste the food present in the enclosure, and to do so without leading to scalding spray during decompression, even while the appliance continues to be subjected to constant heater power.

The above-mentioned pressure range thus makes it possible to benefit from the advantages in terms of flexibility of use of a conventional stew pan, and also the advantages of cooking under pressure, since even if the range 4.5 kPa to 30 kPa is well below the conventional range of 55 kPa to 90 kPa, the cooking pressure $P_c$ determined by the Applicant in the context of the present invention enables a significant amount of time to be saved compared with conventional stockpots that operate at pressures close to atmospheric pressure.

Consequently, the pressure cooker device of the invention serves firstly to enable genuine pressure cooking to be performed, while secondly also allowing decompression to be performed safely, and sufficiently quickly to enable the user to open the lid at will while cooking is taking place, without it being necessary to take the appliance away from the source of heat, and without it being necessary to modify (e.g. turn down) the power of said source.

Preferably, the cooking $P_c$ of the appliance in accordance with the invention lies in the range 5 kPa to 30 kPa, with ranges of 5 kPa to 10 kPa, 10 kPa to 15 kPa, 15 kPa to 20 kPa, 20 kPa to 25 kPa, and 25 kPa to 30 kPa also serving to give individual results that are of interest.

In particularly advantageous manner, the cooking pressure $P_c$ is substantially equal to 20 kPa.

The Applicant has thus established that for a cooking pressure that is substantially equal to 20 kPa, which enables temperatures inside the enclosure to rise to about 105° C., the saving in cooking time obtained with the appliance in accordance with the invention compared with a conventional stew pan is of the order of:

25% for cooking roast pork;
33% for cooking carrots in water; and
22% for cooking salmon in steam.

In addition, with an appliance in accordance with the invention having its cooking pressure $P_c$ substantially equal to 20 kPa, it is possible to obtain a decompression time of about 5 seconds (the time which corresponds to the time needed for the pressure that exists inside the enclosure to drop from its cooking value to a value that is compatible with safe opening of the lid) under the following conditions:

the appliance contains 1 liter (L) of water;
the appliance is subjected to an induction type heater source, delivering power that is substantially equal to 450 watts (W); and
the appliance is subjected continuously to the influence of the heater source, even during the decompression operation.

Advantageously, the household appliance for cooking under pressure in accordance with the invention also includes opening safety means 7 that is sensitive to the pressure and/or the temperature that exists inside the enclosure.

Advantageously, the opening safety means 7 is designed to interact with the locking and unlocking means 3 so as to prevent the lid 2 being unlocked relative to the bowl 1 so long as the pressure that exists inside the enclosure remains above a predetermined value and/or so long as the temperature inside the enclosure is above a predetermined value.

Preferably, the opening safety means 7 comprises a pressure-gauge rod 7A that is sensitive to the pressure that exists inside the enclosure, and that is mounted to move through a hole 8 formed in the lid 2, between a low position (shown in FIGS. 7 and 9) in which the rod 7A allows the lid 2 to be locked or unlocked relative to the bowl 1, and a high position (shown in FIGS. 2, 3, and 5) in which the rod 7A co-operates with the locking and unlocking means 3 to prevent the lid 2 being unlocked from the bowl 1.

Such an opening safety means is well known in terms of its general principle. It provides positive safety for opening, by allowing the lid 2 to be separated from the bowl 1 solely when the level of the pressure inside the enclosure reaches a level that is acceptable from the point of view of user safety.

Advantageously, the opening safety means 7, e.g. comprising a pressure-gauge rod 7A, is designed so as to be held in the high position under the effect of the pressure that exists inside the enclosure once said pressure reaches a "rise" relative pressure value lying substantially in the range 1.5 kPa to 4 kPa.

Preferably, the opening safety means 7 is designed so that the rise pressure is substantially equal to 3 kPa±0.5 kPa.

Even more advantageously, the rise pressure is substantially equal to 3.3 kPa.

Advantageously, the opening safety means 7 is designed to move down towards its low position when the pressure inside the enclosure reaches a "descent" relative pressure value lying substantially in the range 1 kPa to 4 kPa, and more preferably in the range 1.5 kPa to 4 kPa.

Said descent pressure is also generally substantially lower than the rise pressure.

Preferably, the descent pressure lies substantially in the range 1.5 kPa to 2 kPa, or in the range 1.5 kPa to 2 kPa, excluding the bottom limit (1.5 kPa). The descent pressure may also lie in the range 1.6 kPa to 2 kPa, or in the range 2 kPa to 3 kPa, or indeed in the range 3 kPa to 4 kPa, without thereby going beyond the ambit of the invention.

A descent pressure substantially equal to 2.5 kPa±0.5 kPa also gives good results.

In general, in the context of the invention, the opening safety means 7, as formed by the pressure-gauge rod 7A, for example, should be dimensioned and shaped so that the descent pressure, while being lower than the rise pressure, is nevertheless as close as possible to the rise pressure.

The opening safety means 7 should also be designed so that the descent pressure is as high as possible, within the limits set by the standards that are in force, which at present require a limit of 4 kPa that must not be exceeded by the descent pressure. Choosing a descent pressure that is high, e.g. lying in the range 1.5 kPa to 2 kPa, makes it possible to open the lid 2 of the cooking appliance more quickly, compared with prior art pressure cookers in which the descent pressure generally does not exceed 0.5 kPa.

However, obtaining a high descent pressure generally involves the pressure-gauge rod 7A being heavier.

This increase in weight is naturally detrimental to a fast rise of the pressure-gauge rod 7A towards its high position while the pressure inside the appliance is rising, and that can slow down the cooking cycle.

That is why, in the context of the invention, provision is advantageously made for the appliance to be fitted with actuator means 10 for driving the safety rod 7A, said actuator means 10 being arranged to enable the rod 7A to be placed in its high position regardless of the value of the pressure that exists inside the enclosure.

In this way, it is the actuator means 10 itself that acts mechanically to force the rod 7A towards its high position, which high position is preferably a leaktight position due to the presence of a sealing gasket 12 against which the rod 7A comes to bear.

Advantageously, the opening safety means 7 is also functionally connected to signaling means to inform the user whether or not it is possible to open the lid 2.

Preferably, the signaling means is of the visual kind and is advantageously constituted by the body of the pressure-gauge rod 7A itself, which, depending on its position, is visible or not visible to the eyes of the user via an opening 7B arranged in the protective casing 7C containing the opening safety means 7, in particular.

This disposition enables the user to proceed immediately with unlocking the lid 2, since the user is informed at the very instant when the pressure conditions inside the enclosure become compatible with safe unlocking.

There follows a description of the operation of the cooking appliance in accordance with the invention.

Initially, the user puts food in the bowl 1, i.e. directly in the bowl or indirectly, via a removable basket that is contained in the bowl 1.

The user then puts the lid 2 on the bowl 1, as shown in FIGS. 9 and 10. At this instant, the jaws 3B and 3C are in the unlocking position, with the decompression means being activated (i.e. the actuator head 6A is held in the high position by the ramp 9), while the opening safety rod 7 is in the low position.

The user then proceeds to lock the lid 2 on the bowl 1, to establish leaktightness, by turning the knob 3A clockwise over a first predetermined stroke, thereby entraining the jaws towards their locking position, by moving centripetally and radially in translation, and also by means of a ramp 10 that forms the actuator means pushing the safety pressure-gauge rod 7A directly towards its high position, while simultaneously deactivating the decompression means 6, which then becomes pressure regulator means.

The cooking appliance is then in the situation shown in FIGS. 3 and 4, i.e. in a substantially leaktight and locked configuration. The appliance can thus rise in pressure quickly up to its operating pressure lying in the range 4.5 kPa to 30 kPa, which pressure is regulated by the regulator means 6.

If the user desires to open the lid while cooking is taking place, it suffices to turn the knob 3A counterclockwise over a second predetermined stroke, thereby moving the ramp 9 so that it raises the head 6A and thus leads to a leak of steam that leads to the enclosure being decompressed.

As shown in FIGS. 5 and 6, the pressure-gauge rod 7A, which at this state is no longer supported by the ramp 10, nevertheless remains in its high position so long as the pressure that exists inside the enclosure substantially exceeds the descent pressure, e.g. lying in the range 1.5 kPa to 2 kPa.

While in its high position, the pressure-gauge rod 7A co-operates with a rib 11 on the intermediate part 3D so as to prevent the lid 2 from being unlocked relative to the bowl 1.

Thereafter, once the pressure inside the enclosure has dropped below the descent pressure, the pressure-gauge rod 7A returns automatically to its low position, thus allowing the lid to be unlocked.

The operation of opening the lid turns out to be extremely short, because of a well-chosen operating pressure level for the appliance in combination with the descent pressure, where said operating pressure level also serves to perform cooking quickly.

Finally, it should be observed that the invention is not directed exclusively to an appliance provided with opening safety means, and that it relates in particular to a household appliance for cooking under pressure and comprising:
- a cooking bowl 1 and a lid 2 designed to be fitted and locked on said bowl 1 so as to form a substantially leaktight cooking enclosure;
- means 3 for locking and unlocking the lid 2 relative to the bowl 1;
- pressure regulator means 6 arranged to maintain the relative pressure inside the enclosure at a predetermined value $P_c$ that is substantially constant and that is referred to as the cooking pressure; and
- activatable and deactivatable decompression means 6 arranged, when activated, to allow the pressure that exists inside the enclosure to drop; wherein the pressure regulator means 6 is designed so that the cooking pressure $P_c$ lies substantially in the range 4.5 kPa to 19.9 kPa, independently of the implementation of opening safety means.

It turns out that the range 4.5 kPa to 19.9 kPa, and indeed the ranges 5 kPa to 19.9 kPa or 10 kPa to 19.9 kPa provide an excellent compromise between cooking time and the speed with which the lid can be opened while cooking is taking place.

What is claimed is:

1. A household appliance for cooking under pressure, the appliance comprising:
    a cooking bowl and a lid for fitting and locking on the bowl to form a substantially leaktight cooking enclosure;
    means for locking and unlocking the lid relative to the bowl;
    pressure regulator means arranged to maintain a relative pressure inside the enclosure at a predetermined value that is substantially constant and referred to as the cooking pressure, said regulator means being designed for the cooking pressure to lie substantially in the range of 45 kPa to 30 kPa;
    activatable and deactivatable decompression means arranged, when activated, to allow the relative pressure that exists inside the enclosure to drop from the cooking pressure to at least a second value that is lower; and
    opening safety means responsive to the relative pressure that exists inside the enclosure and mounted to move between a low position in which the opening safety means allows the lid to be locked and unlocked relative to the bowl, and a high position in which the opening safety means co-operates with the means for locking and unlocking to prevent the lid from being unlocked relative to the bowl;
    wherein the opening safety means is designed to move down towards the low position from the high position when the relative pressure inside the enclosure reaches the second value, the second value lying substantially in the range of 1 kPa to 4 kPa.

2. An appliance according to claim 1, wherein the second value of the relative pressure lies substantially in the range of 1.5 kPa to 4 kPa.

3. An appliance according to claim 2, wherein the second value of the relative pressure lies substantially in the range of 1.5 kPa to 2 kPa.

4. An appliance according to claim 1, wherein the cooking pressure lies substantially in the range of 10 kPa to 30 kPa.

5. An appliance according to claim 4, wherein the cooking pressure is substantially equal to 20 kPa.

6. An appliance according to claim 1, wherein the opening safety means is designed to be maintained in the high position under the effect of the pressure that exists inside the enclosure once said pressure has reached a "rise" relative pressure value lying substantially in the range of 1.5 kPa to 4 kPa.

7. An appliance according to claim 6, wherein the rise pressure is substantially equal to 3 kPa±0.5 kPa.

8. An appliance according to claim 1, including actuator means for actuating the opening safety means, said actuator means being arranged to enable the opening safety means to be put in the high position regardless of the value of the pressure that exists inside the enclosure.

9. An appliance according to claim 1, wherein the opening safety means is functionally connected to signaling means to inform the user whether to not it is possible to open the lid.

10. An appliance according to claim 9, wherein the signaling means is of a visual nature.

* * * * *